United States Patent [19]

Wymore et al.

[11] 3,781,812

[45] Dec. 25, 1973

[54] ADDRESSING SYSTEM RESPONSIVE TO A TRANSFER VECTOR FOR ACCESSING A MEMORY

[75] Inventors: Charles E. Wymore; Clayton P. Dahlberg, both of Santa Barbara, Calif.

[73] Assignee: Burroughs Corporation, Detroit, Mich.

[22] Filed: June 28, 1971

[21] Appl. No.: 157,307

[52] U.S. Cl. ........................................... 340/172.5

[51] Int. Cl. ........................................... G06f 7/00

[58] Field of Search ................................ 340/172.5

[56] References Cited

UNITED STATES PATENTS

| | | | |
|---|---|---|---|
| 3,533,077 | 10/1970 | Bell et al. | 340/172.5 |
| 3,238,510 | 3/1966 | Ergott, Jr. | 340/172.5 |
| 3,573,855 | 4/1971 | Cragon | 340/172.5 |
| 3,274,566 | 9/1966 | McGrogan, Jr. | 340/172.5 |
| 3,401,375 | 9/1968 | Bell et al. | 340/172.5 |

OTHER PUBLICATIONS

"Thin Film Memory Computer" - 1961, Sperry Rand Corp.; pages 4–11.

*Primary Examiner*—Harvey E. Springborn
*Attorney*—Christie, Parker & Hale

[57] ABSTRACT

A memory comprising a plurality of bit storing containers each having upper and lower boundaries is partitioned into a plurality of modules. The containers in each module are arranged in a plurality of locations. Fields of data bits can be stored partly in one module and partly in another module and can thereby extend across the boundary between modules. Each module is coupled to its own access control means. During a memory access, each access control means receives an absolute address signal, responds thereto to select a location in its associated module; all the containers in the selected location are accessed; and data bits are transferred between a data register and a selected group of the accessed containers. The absolute addresses are derived from a bit boundary address and a transfer vector. The bit boundary address comprises a field of encoded signals which field has a length sufficiently long to specify an arbitrary boundary in the memory. A subfield of the bit boundary address is selectively modified by address modifying circuitry so as to produce the absolute addresses. The transfer vector comprises a transfer sign field and a transfer width field. The transfer sign field indicates which side of a specified boundary has the containers involved in the data transfer. The transfer width field indicates the number of bit containers involved in the data transfer. Circuitry coupling the memory to the data register provides rotation and masking so that the contents of accessed containers which are not involved in the data transfer do not affect the data transfer or change as a result thereof.

11 Claims, 9 Drawing Figures

FIG. A
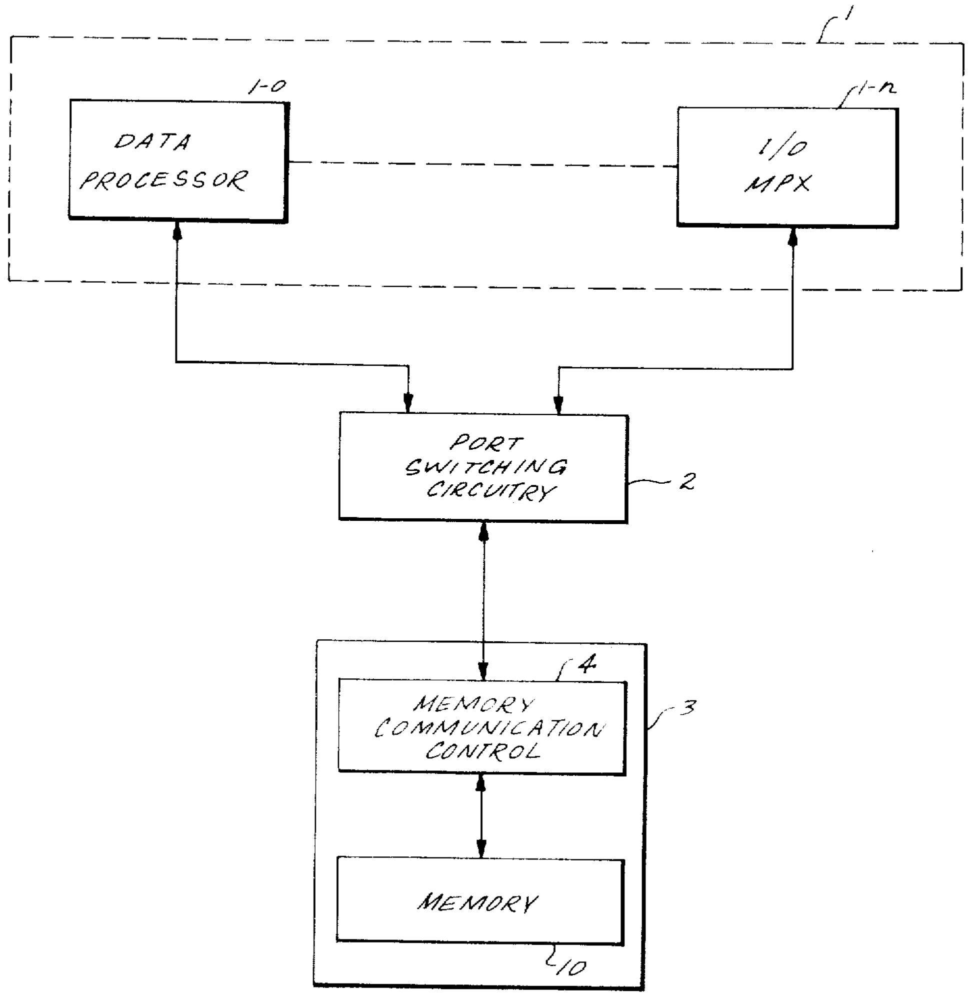
INVENTOR.
CLAYTON P. DAHLBERG
CHARLES E. WYMORE
BY
Christie, Parker & Hale
ATTORNEYS

ADDRESSING SYSTEM RESPONSIVE TO A TRANSFER VECTOR FOR ACCESSING A MEMORY

CROSS-REFERENCE TO RELATED APPLICATION

Application Ser. No. 157,297 filed June 28, 1971 entitled VARIABLE WORD WIDTH PROCESSOR CONTROL by Roger E. Packard and assigned to the assignee of this invention discloses a data processor which provides address signals comprising a bit boundary address and a transfer vector. The present invention is directed to a system employing such address signals to transfer information into and out of an addressable memory.

The subject hereof is also related to U.S. Pat. Nos. 3,680,058 and 3,654,621.

BACKGROUND OF THE INVENTION

1. Field of the Invention

This invention relates to data processing systems and, more particularly, to an addressing system for a memory.

2. Description of the Prior Art

Random access memories are well known in the computer art. Such memories can be constructed from many different types of bit storing devices, commonly called cells or containers, such as magnetic cores, thin film elements, flip-flop circuits and the like. By random access is meant that the containers are grouped together into locations and that information items can be written into or read from any group of containers forming one location in approximately the same time as from any other location.

In early computer systems the information to be processed was usually grouped into words having a field length equal to the number of containers per location in the system memory. As the range of problems presented to data processing systems expanded the types of formats used to represent information items that must be handled have multiplied. Thus the memory must store fields of data which may have field lengths shorter than or longer than the number of containers in a location. In order to use the available storage capacity of the memory efficiently it becomes necessary to pack or link information items together. By packing is meant that more than one information item is stored in a particular location. By linking is meant that a part of an information item is stored in one location and that another part of the same information item is stored in a different location.

When information items are packed or linked together a problem arises in that it is necessary for the addressing system to specify not only a particular location but also to specify particular containers within a selected location. The prior art approaches to this problem have been to store in an address register an indication of a starting container and an indication of the number of containers involved in a data transfer. Each container is assigned one of an ordered set of numbers by which it can be indicated. According to one approach the starting container is the least significant container and according to another approach the starting container is the most significant container. In either case, addressing is always in one direction. That is, data is transferred to or from only the containers having either higher or lower significance respectively than that of the starting container.

A notational system has been developed for describing the transfer of data fields between different parts of a computer system. An illustration of a general expression in this notational system describing the transfer of data from memory is MIR M[MSB:FL]. MIR is a memory information register, M is the memory, MSB indicates the most significant bit of a data field and FL indicates the length of the data field. The combination of the MSB and the FL describes the containers in the memory which store the data field. The arrow symbolizes the transfer of the field and points in the direction of the transfer. A specific example in this notational system describing a memory read for an addressing system using most significant container addressing and unidirectional addressing only is MIR M[30:3]. This expression symbolizes the reading out of the contents of the containers which have been assigned the numbers 30, 31 and 32 and the storage of the read out contents into the memory information register.

In many programmatic procedures algorithms are executed in which memory addresses are modified. A typical procedure may be written to rearrange from one order into a preselected order a set of numbers that are stored in sequentially numbered containers. For example the numbers could represent monthly sales of a retailer and be arranged according to month. A procedure can be written to rearrange the monthly sales numbers according to magnitude.

In executing these and other types of algorithms the processor may produce indications of either the least significant container or the most significant container. If the hardward memory addressing system has only unidirectional addressing capability, the programmer must make sure that the addresses produced by his algorithm are compatible with the hardware addressing system. Often the programmer will include extra instructions in his program to modify the addresses developed in executing the algorithm. If for example, the algorithm develops an indication of the least significant container and the hardware addressing system is adapted to respond to most significant container indication the programmer must include an instruction to replace the least significant container indication with the most significant container indication. This replacement can be symbolized by the expression MSB 27[LSB − (FL − 1)]. As a specific example consider the situation in which it is desired to read out a two bit field stored in the containers numbered 29 and 30 and in which the algorithm has developed an indication of the least significant container, which is numbered 30 in this example. The MSB would be computed as 30 − (2−1) or 29.

SUMMARY OF THE INVENTION

This invention is directed to an addressing system which is responsive to an indication of a boundary of a memory container to access containers on either side of the indicated boundary in accordance with an indicating addressing direction.

An embodiment of the invention is in a data processing system having a random access memory. The memory has a plurality of containers for storing bits of information. Each container is assigned one of an ordered set of numbers so that the containers can be distinguished from one another. The containers are grouped into locations and all containers in a particular location are accessible for reading or writing during one memory access cycle in response to an absolute address signal indicating the particular location. A source is provided for supplying fields of coded address signals. One address field indicates a boundary of a container in the memory and a second field indicates an addressing direction. That is, the second field indicates whether a data transfer involves the containers which have been assigned higher numbers or thee containers which have been assigned lower numbers. Means are provided to respond to the first and second fields to produce an absolute address to access the memory and enable a data transfer with containers on the indicated side of the specified boundary. The means for producing the absolute addresses includes an address modifying circuit which automatically modifies the first field under the control of the second field.

In a preferred embodiment of the invention the memory is partitioned into a plurality of independently operating modules. Each module is coupled to its own access control circuitry so that information can be transferred to or from all modules simultaneously. The modules have corresponding pluralities of locations with each location having a lower container, an upper container and a plurality of interior containers. Each container is associated with upper and lower boundaries which is shares with other containers. The upper container of a location in one module shares its upper boundary with the lower container in a location in another module. A source is provided for specifying a desired boundary and for indicating an addressing direction. Means are provided for supplying absolute addresses to the access control circuits in response to the specified boundary and addressing direction.

A feature of the preferred embodiment of the invention is that the field length of the data to be transferred can be controlled by a source producing a transfer width field. During write operations, data is written into selected containers within a location without affecting the contents of other containers in the same location. During read operations, data is read from selected containers within a location for loading a data register and the contents of other containers in the same location do not affect the loading of the data register. To that end, rotation and masking circuitry are combined for providing isolation of the data fields. The rotation circuitry responds to the indicated addressing direction and to the transfer width field for rotating the individual bits of data so that they are properly aligned for processing. The masking circuitry responds to the transfer width field for inhibiting transmission of data from or to containers that are outside of the desired field.

BRIEF DESCRIPTION OF THE DRAWINGS

FIG. A is an overall block diagram of a data processing system embodying the present invention.

DETAILED DESCRIPTION OF THE PREFERRED EMBODIMENT

Figure 1:
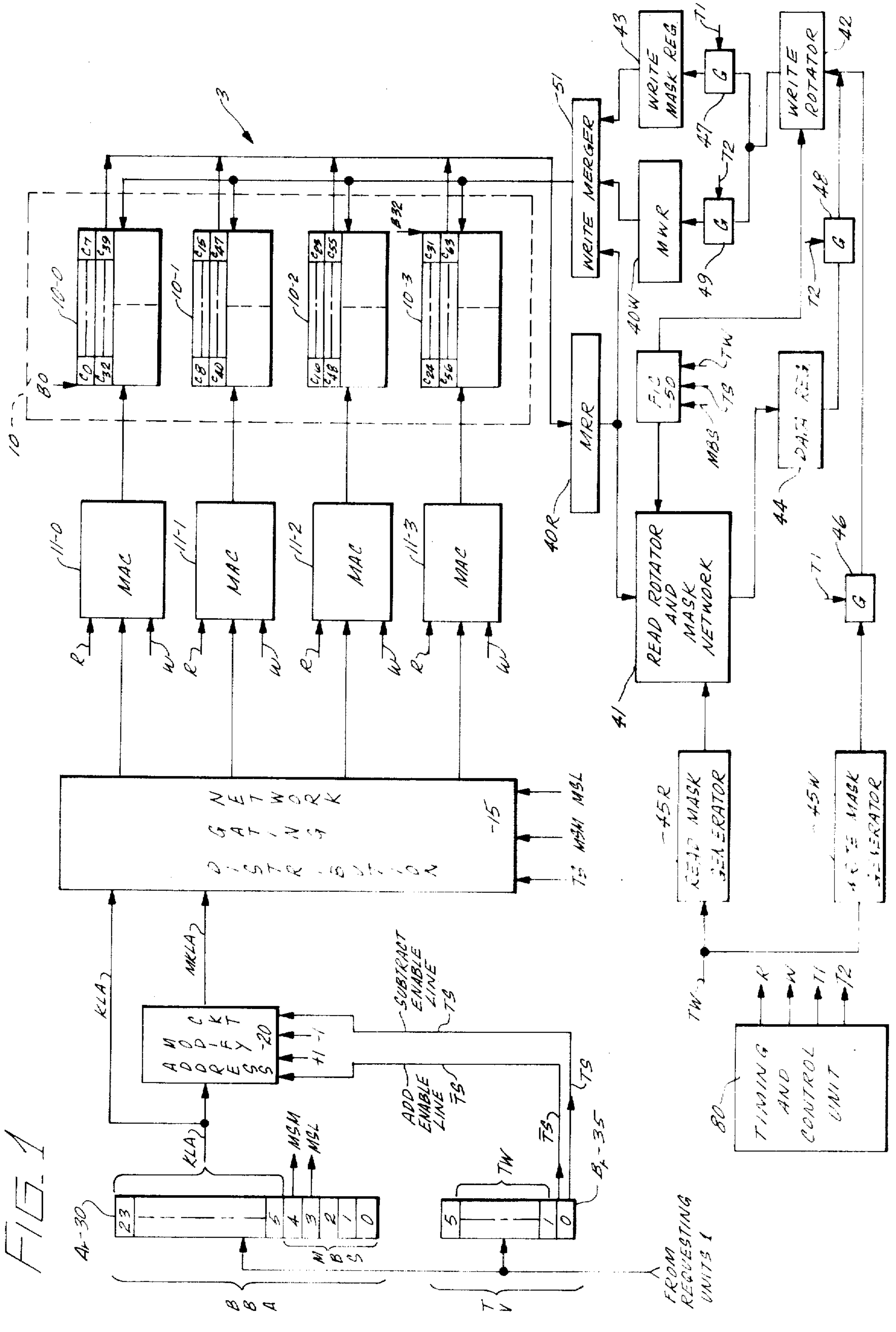
FIG. 1 is a block diagram of a memory and addressing system therefor and embodying the present invention.

FIG. A shows in block diagram form the major components of a data processing system embodying the present invention. A memory and memory addressing system 3 includes a main memory 10 which stores information for a plurality of requesting units 1 such as a data processor 1–0 and an input/output multiplexor 1–$n$. Preferably, data processor 1–0 is of the type described in the copending application cross-referenced above. The requesting devices are coupled to the main memory 10 through port switching circuitry 2 and memory communications control 4. Port switching exchange 2 comprises conventional circuitry for providing a communications path between any selected one of the requesting units 1 and memory 10.

Each of the requesting units 1 provides address information to port switching circuitry 2 which gates the address information to memory and memory addressing system 3. The provided address information comprises a bit boundary address (BBA) and a transfer vector (TV). The requesting units also provide information to be written into memory 10 during write requests and accept information read out of memory 10 during read requests.

Consider now FIG. 1 which shows memory and memory addressing system 3 in block diagram form. The memory 10 is shown within dashed lines and the memory communication control circuitry is shown generally throughout FIG. 1.

FIG. 1 shows memory 10 is partitioned into four independently operating modules 10–10 through 10–3. Each module is a conventional random access memory and can be constructed from many different types of bit storing containers such as magnetic cores, thin films, flip-flops or the like. In the preferred embodiment, the bit storing containers are high speed non-destructive read out bistable elements. FIG. 1 shows that each module is partitioned into addressable locations having eight containers in a row. Information is read from or written into a module one location (i.e., eight containers in parallel) at a time.

Each container is assigned one of an ordered set of numbers so that the containers can be distinguished from one another. For purposes of explanation the containers in the first locations of the modules are referenced as follows: in module 10–0, CO through C7; in module 10–1, C8 through C15; in module 10–2, C16 through C23; and in module 10–3, C24 through C31. The containers in the second locations of the modules are referenced as follows: in module 10–0, C32 through C39; in module 10–1, C40 through C47; in module 10–2, C48 through C55; and in module 10–3, C56 through C63. The existence of many other containers is suggested by dashed lines. These other containers are assigned increasing numbers in the same sequential manner as described above for the containers in the first and second locations.

Each container in the memory is associated with an upper boundary and with a lower boundary. As examples, the lower boundary of container CO is referenced as BO and the upper boundary of container C31 is referenced as B32. Each boundary is shared by a pair of adjacent containers. For example B32 is both the upper boundary of C31 and the lower boundary of C32. Since containers C31 and C32 share the same boundary, it can be seen that, while they are contained in different locations, they are adjacent. As is well known, the containers in an addressable memory need not be and generally are not spacially arranged contiguously in rows. Thus, it should be kept in mind that references made herein such as references made to adjacent containers and to groups of contiguous containers are not directed to the relative physical placement of the containers. Instead, such references are directed to the addressability of the containers. By way of example, as used herein, two containers are adjacent if they are associated with incrementally different ones of the ordered set of numbers discussed above. By the same token, the spacial relationship between locations is of no particular significance. Accordingly, references made herein to contiguous locations are directed to the addressability of the locations.

Each module is coupled to its own memory access control circuit (MAC). The MACs are referenced in FIG. 1 as 11–0 through 11–3. Each MAC is responsive to an absolute address signal to select a location in the module to which it is coupled and cause data bits to be transferred between the containers in the selected location and a memory information register 40. The memory information register 40 is partitioned into write and read information registers MWR40W and MRR40R. Both MWR40W and MRR4OR have 32 flip-flops which are referred to as MWR[31:32] and MRR[31:32], respectively in accordance with the above-mentioned notational system. The transfer of data can be in either direction. That is, an MAC responds to a read control signal on its R input to read data from the selected location for transfer to the MRR40R and an MAC responds to a write control signal to transfer data in the MWR40OR for writing into the selected location. The source of the read and write control signals is a conventional control and timing unit shown as block 80.

Although the invention is not limited thereto, in the preferred embodiment of the present invention the read operation is non-destructive. Briefly, the read operation proceeds as follows: one of the requesting units 1 of FIG. 1A provides address information and memory 10 is accessed by MAC11–0 through MAC1-1–3 and 32 data bits are read out and loaded in MRR40R. Data fields stored in MRR40R are transferred to a data register 44 through a read rotator and masking network 41. Finally, the data field stored in data register 44 is coupled by means not shown back to the requesting unit 1. Read rotator 41 serves to isolate a desired subfield from the 32 bits stored in MRR40R and to rotate the desired subfield into a desired position in data register 44. A field isolation control unit (FIC)50 controls the number of digit places by which read rotator 41 rotates the desired field, and a read mask generator 45R controls the masking function of read rotator 41. Data register 44 comprises 24 flip-flops referenced as Dr[23:24]. The operation of rotating and masking a field of data is called justifying that field. The field could be either right or left justified as desired. In the preferred embodiment a convention is adopted whereby the least significant bit of a field is stored in Dr[0:1]. Therefore a desired data field read from memory 10 is always right justified for storage in data register 44. The amount of the shift of the desired field is controlled by FIC50. The construction and operation of FIC50 will be described in connection with the description of FIG. 3. The construction and operation of read rotator 41 will be described in connection with the description of FIGS. 4 and 5. The overall operation of selecting a desired field and justifying the field will be described in connection with FIG. 8.

The write operation in the preferred embodiment of the present invention involves a non-destructive read phase, a modifying phase, and a restore phase. The purpose of this read/modify/restore cycle is to enable the writing of bits of data into some of the containers in a selected location without affecting the contents of other containers in the selected locations. Briefly, the write operation proceeds as follows: New data which is to be written into memory 10 is stored in data register 44. The source which supplies this data is not shown in FIG. 1; it could be any data source within one of the requesting units 1 of the data processing system. Old data which is in memory 10 is read out and transferred into MRR40R. The output of write mask generator 45W is transferred to write mask register 43 through gates 46 and 47 and write rotator 42. Then the new data is transferred into MWR40W through gates 48 and 49 and write rotator 42. Write merger 51 merges the output of MRR40R and MWR40W under the control of write mask register 43, and the output of write merger 51 is written into memory 10. The construction and operation of write rotator 42 will be explained in connection with the description of FIGS. 4 and 6. The construction and operation of write merger 51 will be explained in connection with the description of FIG. 7.

Figure 2:
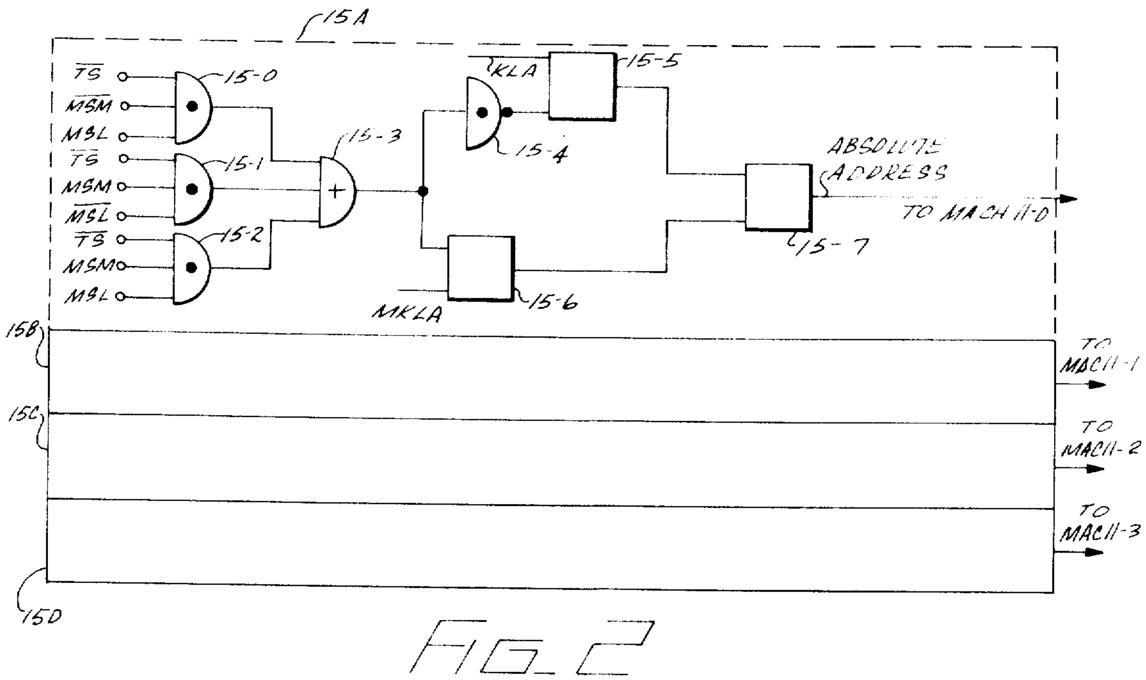
FIG. 2 is a logical block diagram of gating network 15.

Each MAC is coupled to an address distribution gating network 15 to receive therefrom an absolute address signal. Network 15 is a combinatorial network of logical gates which are operative to respond to input control signals recieved on the lines indicated by TS, MSM and MSL to transfer to the MACs an input absolute address received on the lines indicated as MKLA and KLA. Table II is a truth table illustrating the various ways the input addresses are distributed. Table II is given below at the end of this specification. FIG. 2 shows in more detail the way in which a combinatorial gating network could be constructed for distributing addresses to MAC11–0. Table Ii and FIG. 2 are described in more detail hereinafter.

Gating network 15 receives absolute addresses from an address modifying circuit 20 on a line referenced as MKLA and from an address register 30 on line referenced as KLA. KLA is an acronym for key location address and MKLA is an acronym for modified key location address.

Address register 30 comprises a plurality of flip-flops. In the preferred embodiment address register 30 comprises 24 flip-flops, AR30–23 through AR30-0. These 24 flip-flops are sufficient to uniquely indicate any one of $2^{24}$ different container boundaries. The 24 flip-flops taken collectively are a source of a field designated as a bit boundary address (BBA). Any particular BBA could be transferred into address register 30 by any well known means in the computer art. Various subfields of the BBA are stored in address register 30. In the number of flip-flops required to store each subfield depends upon the manner in which the containers in memory 10 are partitioned. In the preferred embodiment the overall memory is partitioned into four modules and therefore a two bit subfield of the BBA is sufficient to indicate which of the four modules includes the BBA. The individual modules are further partitioned into $2^{19}$ locations and therefore a 19 bit subfield of the BBA is sufficient to indicate which location in a module includes the BBA. The individual locations in a module are further partitioned into eight containers and therefore a three bit subfield of the BBA is sufficient to indicate a particular boundary within a module location. The above-mentioned two bit and three bit subfields are concatenated to form a five bit subfield called a module boundary select (MBS) field. Table I which is given at the end of this specification lists the designations of these various fields and identifies the particular flip-flops within address register 30 which store these fields. The first item in Table I shows that the 24 flip-flops of address register 30 taken together define a bit boundary address. This is expressed in the above-mentioned notational system as Ar[23:24] BBA. The 19 most significant flip-flops of address register 30 are Ar[23:19] and they store the KLA field which can indicate a location in a module. The two bit field that indicates which of the four modules includes the BBA is stored in Ar[4:2] and is called the module select (MS) field. The MS field comprises two one-bit fields called MSM and MSL. MSM and its complement MSM are stored in Ar[4:1]; and MSL and its complement MSL are stored in Ar[3:1]. The MBS field is stored in Ar[4:5].

A transfer vector is stored in B register 35. B register 35 comprises six flip-flops which will be referred to as Br[5:5] and Br[0:1]. A five bit subfield of the transfer vector is stored in Br[5:5]. This subfield serves to indicate a transfer width or equivalently the number of containers of memory 10 to which or from which data is transferred. A one bit subfield of the transfer vector, called a transfer sign (TS), is stored in Br[0:1]. The transfer sign serves to indicate an addressing direction or equivalently which side of the specified BBA has the containers that it is desired to access. Br[0:1] actually produces two complementary signals, Ts and Ts.

When Br[0:1] is in one state the TS signal will be a 1 and the TS signal will be a 0. When BR[0:1] is in its other state TS will be a 0 and TS will be a 1. In the preferred embodiment the following conventions are adopted: 1) The most significant bit of a data field is stored in the lowest numbered container of the containers storing the data field; and 2) the TS signal indicates an addressing direction toward containers storing bits of higher order significance when the TS signal is a 1 and indicates an addressing direction toward containers storing bits of lower order significance when the TS signal is a 0. In summary of the foregoing it can be seen that the 24 flip-flops in address register 30 and the six flip-flops in B register 35, taken collectively are a source of an address code. The address code comprises first, second and third fields. The first field (BBA) can specify a boundary between any arbitrary two containers in the memory. The second field (TS) can specify one of either side of the specified boundary. And, the third field (TW) can specify any one of a variable number of containers which are to be involved in a data transfer. Moreover, it should be noted that the same containers are identifiable by either of two address codes. Thus, a first address code including a BBA specifying the upper boundary of the container storing the least significant bit of a data field and including a TS indicating an addressing direction toward containers storing bits of higher order significance identifies the same containers as a second address code including a BBA specifying the lower boundary of the container storing the most significant bit and including a TS indicating an addressing direction toward containers storing bits of lower order significance.

Although the five bits of the transfer width field could uniquely indicate 32 different possible transfer widths, in the preferred embodiment only 24 possible widths are used. Of course other embodiments of the invention could have a longer or smaller number of possible transfer widths. The field length has been restricted to a 24 bit wide length because the preferred embodiment in the invention is used in connection with a data processing system having a basic word length of 24 bits. Furthermore, by so restricting the field length it is possible to guarantee that all bits of a desired field can be obtained from memory 10 in a single access cycle. Consider for example what would happen if the desired field length were 26 containers long with the addressing direction toward higher numbered containers starting from container C7. In this situation containers C7 through C31 would be addressed. However both C7 and C32 are in the same module, that is module 10–0. Therefore the designs of the individual modules would have to allow simultaneous access to more than one location or more than one access cycle would have to be used to obtain the desired field. Other possible approaches which would avoid this problem would be to partition the memory 10 into a larger number of modules or to provide more containers in the individual module location.

The five bit TW field is applied in parallel to both read mask generator 45R and write mask generator 45W. Both the read and write mask generators are conventional encoders. Read mask generator 45R has 24 output lines RMG[23:24] which are coupled to read rotator 41. Read mask generator 45R responds to the 24 combinations that are used in the preferred embodiment of the 32 possible combinations of the five bits of the TW field to produce 24 different masking outputs. These 24 masking outputs are 24 0's and no 1's (RMG[23:24] = 0), 23 0's and one 1 (RMG[23:23] = 0; RMG[0:1] = 1), and so forth through no 0's and 24 1's (RMG[23:24] = 1). Write mask generator 45W has 24 output lines which are coupled to write rotator 42 by gate 46. Write mask generator 45W responds to the five bit TW field in the same manner as read mask generator 45R.

Address modifying circuit 20 comprises a conventional binary add/subtract circuit which is operable to either increment or decrement by one of the KLA field which is supplied by address register 30 so as to produce the MKLA field for application to network 15. The operation of address modifying circuit 20 is controlled by the state of the transfer sign. To that end, the TS signal and the TS signal stored in Br[0:1] are coupled to address modifying circuit 20 by a Subtract Enable line and an Add Enable line respectively. When the TS signal is a 1 address modifying circuit 20 responds to decrement the KLA field by one and when the TS signal is a 1 address modifying circuit 20 responds to increment the KLA field by one.

Consider now Table II which tabulates the manner in which network 15 gates absolute addresses from address modifying circuit 20 to the MACs 11–0 through 11–3. The first three columns of the table list the eight possible states that the three input control signals to network 15 can assume. The last four columns indicate whether network 15 gates an unmodified absolute address, that is a KLA, or gates a modified absolute address, that is a KLA+1 or KLA−1, to the individual MACs.

The first row of Table II shows that if TS, MSM, and MSL are all 0 then network 15 gates the unmodified KLA to each of MACs 11–0 through 11–3. The second row shows that if TS is a 1 and MSM and MSL are 0 then network 15 gates the unmodified KLA to MAC11–0 and gates KLA−1 to each of MACs 11–1 through 11–3. An important point brought out by this table should be noted here. In the first and second rows of the table both MSL and MSM are 0. This condition of MSL and MSM indicates that the boundary specified by the BBA is adjacent to a container in the module 10–0. Therefore, irrespective of the state of TS the same location in module 10–0 will be accessed. However, the location to be accessed in the other modules 10–1 through 10–3 depends upon whether TS is a 0 or a 1. Assume for example that the BBA stores in address register 30 specifies boundary B33 which is the upper boundary of container C32 and the lower boundary of container C33. FIG. 1 shows that C32 and C33 are in the second location of module 10–0. Therefore irrespective of the addressing direction this second location must be accessed. FIG. 1 also shows that container C31 is in the first location of module 10–3 and that container C56 is in the second location of module 10–3. Therefore if the addressing direction is toward container C56 the second location of module 10–3 must be accessed whereas if the addressing direction is toward container C31 the first location of module 10–3 must be accessed.

The third and fourth rows of Table II bring out the same point. In both the third and fourth rows MSM is 0 and MSL is 1. This indicates that the specified boundary is adjacent to a container in module 10–1. Therefore irrespective of the state of TS the same location in module 10–1 will be accessed. However the location to be accessed in modules 10–0, 10–2, and 10–3 depends upon whether TS is a 0 or a 1. Thus the third row indicates that if TS is a 0 when MSM is a 0 and MSL is a 1 then network 15 gates the unmodified KLA to MACs 11–1, 11–2, and 11–3 and gates KLA+1 to MAC 11–0; whereas the fourth row indicates that if TS is a 1 when MSM is a 0 and MSL is a 1 then network 15 gates the unmodified KLA to MACs 11–0 and 11–1 and gates KLA−1 to MACs 11–2 and 11–3.

The fifth and sixth rows and the seventh and eighth rows of Table II bring out the same point with respect to boundaries adjacent to containers in the modules 10–2 and 10–3 respectively.

The block diagram of a part of network 15 which appears in FIG. 2 together with the following brief description thereof and with the truth table of Table II sufficiently describe the construction and operation to enable those skilled in the art to construct this element of the preferred embodiment.

FIG. 2 is a schematic and block diagram of network 15 which includes distribution gating circuits 15A, 15B, 15C and 15D. The distribution gating circuits are responsive to the TS, MSM, MSL signals; their complements TS, MSM, and MSL; and the KLA and MKLA fields to supply an absolute address to MAC 11–0 through MAC 11–3 respectively. The details of distribution gating circuit 15A are specifically shown to illustrate the type of combinatorial logic network which can implement the part of the truth table of Table II relating to MAC11–0. The internal details of gating circuits 15B, 15C and 15D are not specifically shown because they are similar to the details of gating circuit 15A and because their construction is evident from the truth table of Table II relating to MAC11-1 thorugh MAC11-3.

Within gating network 15A of FIG. 2 there is shown three AND gates 15–0, 15–1, and 15–2. Each of these AND gates has an output coupled to an OR gate 15–3. OR gate 15–3 receives a 1 signal from AND gate 15–0 when all of its three inputs, TS, MSM, and MSL are 1. OR gate 15–3 receives a 1 signal from AND gate 15–1 when all of its inputs TS, MSM, and MSL are 1. OR gate 15–3 receives a 1 from AND gate 15–2 when all of its three inputs TS, MSM and MSL are 1.

The output of OR gate 15–3 is coupled to an inverter 15–4 and to a gate 15–6. The output of inverter 15–4 is coupled to a gate 15–5. Thus the output of OR gate 15–3 either directly partially enables gate 15–6 or indirectly partially enables gate 15–5. Gate 15–6 has an input coupled to receive the MKLA output of address modifier circuit 20 which is shown in FIG. 1. When gate 15–6 is partially enabled it transfers the MKLA field to MAC–0 through gate 15–7. Gate 15–5 has an input coupled to the KLA output of address register 30 which is shown in FIG. 1. When gate 15–5 is partially enabled it transfers the KLA field to MAC–0 through the gate 15–7.

Consider now how the gating shown in gating network 15A of the block diagram of FIG. 2 implements the truth table for the column labeled MAC–0 shown in Table II. Note that there are three conditions under which gating network 15A gates the modified KLA field (KLA+1) to MAC11–0. These three conditions correspond to the three conditions under which OR gate 15–3 receives a 1. Thus the 1 output of OR gate 15–3 causes the MKLA field to be transferred to MAC11–0. For the other five possible conditions the unmodified KLA field is transferred to MAC11–0. Thus when the output of OR gate 15–3 is a 0 inverter 15–4 produces a 1 and causes the unmodified KLA field to be transferred to MAC11–0.

Figure 3:
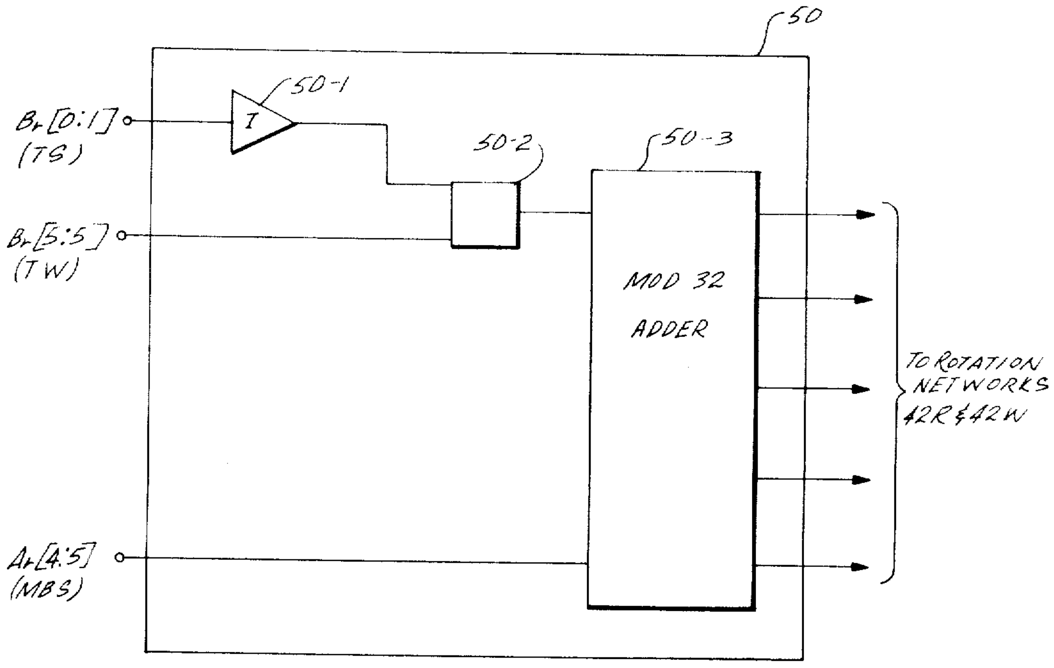
FIG. 3 is a block diagram of the component parts of the field isolation control unit 50 of FIG. 1.

FIG. 3 is a block diagram showing the construction of FIC50. Recall that FIC50 controls the amount that read rotator 41 rotates a field to the left during read operations and controls the amount that write rotator 42 rorates a field to the right during write operations. During read operations FIC50 supplies to read rotator 41 control signals indicating the amount that the desired field is to be rotated to the left from its position in MRR4OR on the basis of the amount of rotation which will cause the least significant bit to be stored in the least significant position (i.e., Dr[0:1]) of data register 44. The following examples illustrate the amount of rotation required. When the least significant bit of the desired field occupies MRR[31:1], a rotation to the left by one digit place causes the least significant bit to be applied to Dr[0:1]. When the least significant bit occupies MRR[30:1] a rotation to the left by two digit places causes the least significant bit to be applied to Dr[0:1]. In general the least significant bit is rotated to the left by the number of digit places to the left of the digit place it occupies in MRR4OR to bring it all the way to the far left plus one extra digit place to cause it to rotate around to the far right.

Note that when TS is a 1 it indicates an addressing direction away from bits of lower significance toward bits of higher significance. Thus when TS is a 1 the specified BBA indicates the upper boundary of the least significant bit of the desired field. On the other hand when TS is a 0 the specified BBA is the lower boundary of the most significant bit of the desired field. From the foregoing, it can be seen that the containers storing the desired field are identifiable either by a first address code specifying the upper boundary of a selected one of the containers and indicating a first side, or by a second address code specifying the lower boundary of a different selected one of the containers and a second side. Since FIC50 produces an indication of the amount of rotation required on the basis of the position of the least significant bit, the FIC50 is responsive to TS to produce different indications depending upon whether TS is a 1 or a 0. To that end FIC50 has an inverter 50-1 which has an input on which it receives the TS signal from Br[0:1]. The output of inverter 50-1 is coupled to an input of a gate 50-2. The gate 50-2 also has inputs on which it receives the transfer width field (TW) from Br[5:5]. The output of gate 50-2 is coupled to a modulo 32 added 50-3. Thus gate 50-2 is operative to apply the transfer width field to adder 50-3 when the TS signal is a 0 and not otherwise. Adder 50-3 also has an input on which it receives a module boundary select field (MBS) which consists of the five least significant bits of the BBA. The MBS field is stored in Ar[4:5]. The output of adder 50-3 is the modulo 32 sum of the transfer width field and the MBS field when TS is a 0 and is equal to the MBS field when TS is a 1.

The output of adder 50-3 represents the number of digit places that a field of data should be rotated to the left by read rotator 41 during a read operation. It also represents the number of digit places that a field of data should be rotated to the right by write rotator 42 during a write operation. The FIC50 output and the transfer width field taken together control the rotation and masking operation involved in transferring data fields. The data fields could be rotated by standard shift registers that shift data bits from flip-flop to flip-flop in response to a sequence of control pulses. In the preferred embodiment however the rotation networks include a gating matrix which is responsive to the output of FIC50 to rotate the data bits by the indicated amount in a single clock pulse.

Figure 4:
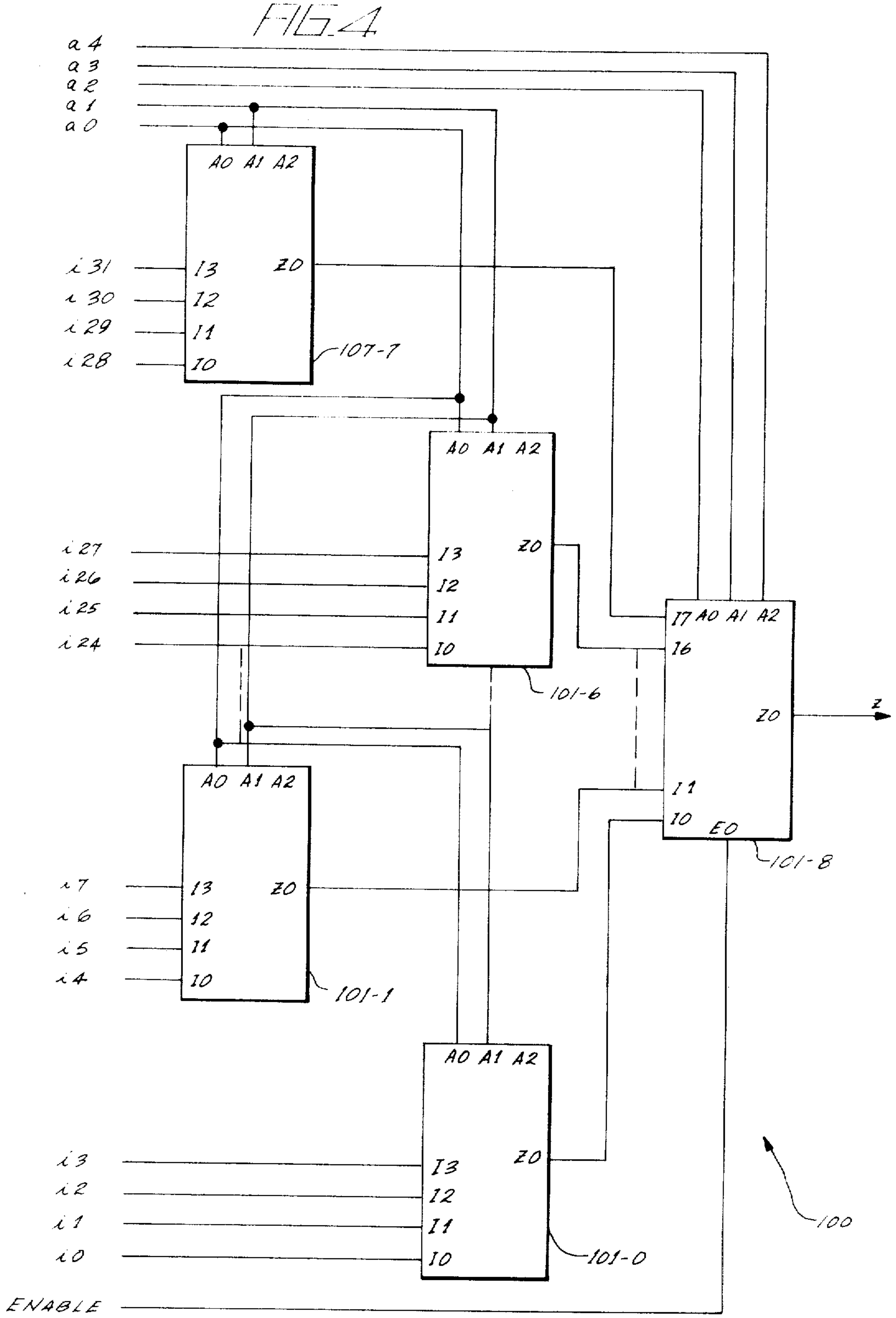
FIG. 4 is a block diagram of a rotation element 100 which is a building block used in the construction of read rotator 41 and write rotator 42.

FIG. 4 shows in block diagram form the construction of a rotation element 100 which is a building block used in the construction of both read rotator 41 and write rotator 42. Rotation element 100 has 32 data input lines *i*0–*i*31, five rotation control lines *a*0–*a*4, an ENABLE line, and a single output line *z*. When a 0 signal is supplied to the ENABLE line a 0 is produced on the output line *z* irrespective of the signals on the input lines. When a 1 is supplied on the enable line, a signal is produced on the output line *z* corresponding to one and only one of the signals supplied to the 32 data input lines *i*0–*i*31. The signals supplied to the five rotation control lines select which one of the 32 possible input signals is gated to the output line.

Rotation control element 100 comprises nine identical multiplexor chips 101-0 through 101-8 (not all shown). Each chip has terminals for accepting eight data inputs I0–I7, three address inputs A0–A2, an enable input E0, and has a single output Z0. Within each multiplexor chip 101, there is gating circuitry which implements the following truth table:

A. For E0 = 1

| INPUTS A2 | A1 | A0 | OUTPUT Z0 |
|---|---|---|---|
| 0 | 0 | 0 | I0 |
| 0 | 0 | 1 | I1 |
| 0 | 1 | 0 | I2 |
| 0 | 1 | 1 | I3 |
| 1 | 0 | 0 | I4 |
| 1 | 0 | 1 | I5 |
| 1 | 1 | 0 | I6 |
| 1 | 1 | 1 | I7 |

B. For E0 = 0, Z0 = 0

Thus, when a chip 101 is enabled by presenting a 1 signal to its E0 input, one of the eight data inputs I0–I7 is switched to output Z0. The particular one of the data inputs switched to the output is selected by the signal presented to the three address inputs A0–A2. Each chip could be constructed from standard discrete gating circuits. However, in the preferred embodiment of this invention each chip is an integrated circuit commercially available from Fairchild Semiconductor Corp. under the part number CTμL 9881. This integrated circuit is preferred because of its small size and its high switching speed.

The nine chips 101-0 through 101-8 are interconnected to form two rotation levels with chips 101-0 through 101-7 forming the first level and 101-8 forming the second level. The A2 input and the I4 through I7 inputs are not used in the chips forming the first level. Also, the E0 input for each of these chips is connected to a source of control signal representing 1 which source is not shown in FIG. 4. The I0 thorugh I3 inputs of each of the chips forming the first level are connected to the data input lines of the rotation element 100. FIG. 4 shows that the I0 through I3 inputs of chip 101-0 are connected to *i*0 through *i*3; the I0 through I3 inputs of chip 101-1 are connected to *i*4 through *i*7; the I0 through I3 inputs of chip 101-6 are connected to *i*24 through *i*27; and the I0 through I3 inputs of chip 101-7 are connected to *i*28 through *i*31. Although not shown in the drawing, the I0 through I3 inputs of chips 101-2 through 101-5 are connected in like fashion to *i*8 through *i*23.

Chip 101-8 which forms the second level of rotation has its E0 input connected to the enable input of rotation element 100 and has its A0 through A3 address inputs connected to rotation control lines *a*2 through *a*4. FIG. 4 shows that chip 101-8 has its I0 input connected to the ZO output of chip 101-0; its I1 input connected to the ZO output of chip 101-1; its I6 input connected to the ZO output of chip 101-6; and its I7 input connected to the Z0 output of chip 101-7. Although not shown in FIG. 4, the I2 through I5 inputs of chip 101-8 are connected to the Z0 outputs of chips 101-2 through 101-5 respectively. The Z0 output of chip 101-8 is connected to the *z* output of rotation element 100.

Consider now two specific examples of the operation of rotation element 100. In the first example, five 0 signals are applied to the five rotation control inputs *a*0–*a*4, a 1 signal is applied to the ENABLE input and a field of 32 data signals is applied in parallel to the 32 data input lines *i*0–*i*31. The 0 signals on the *a*2–*a*4 lines are applied to chip 101–8 and cause that chip to gate the signal presented on its I0 input to the *z* output. The I0 input of chip 101–8 is derived from chip 101–0. The output of chip 101–0 will be the same as its I0 input because its A0–A2 inputs are also 0. Thus when the binary equivalent of decimal 0 is applied to the rotation control element 100, its output is the same as its *i*0 input.

In the second example, the same input signals are present except now 1 signals are applied to the *a*4 input and the *a*3 input and 0 signals are applied to the *a*2, *a*1, and *a*0 inputs. This binary combination (11000) of rotation control signals corresponds to decimal 24. The signals on the *a*2–*a*4 lines are applied to chip 101–8 and cause that chip to gate the signal presented on its I6 input to the z output. The I6 input of chip 101–8 is derived from chip 101–6. The output of chips 101–6 will be the same as its I0 input because its A0–A2 inputs are all 0. The I0 input of chip 101–6 is connected to receive the *i*24 data input signal. Thus when the binary equivalent of decimal 24 is applied to rotation control element 100, its output is the same as its *i*24 input.

These two specific examples are special cases of the general rule whereby rotation control element 100, when enabled, gates to its *z* output the particular one of its inputs corresponding to the decimal equivalent value of the rotation control inputs.

Figure 5:
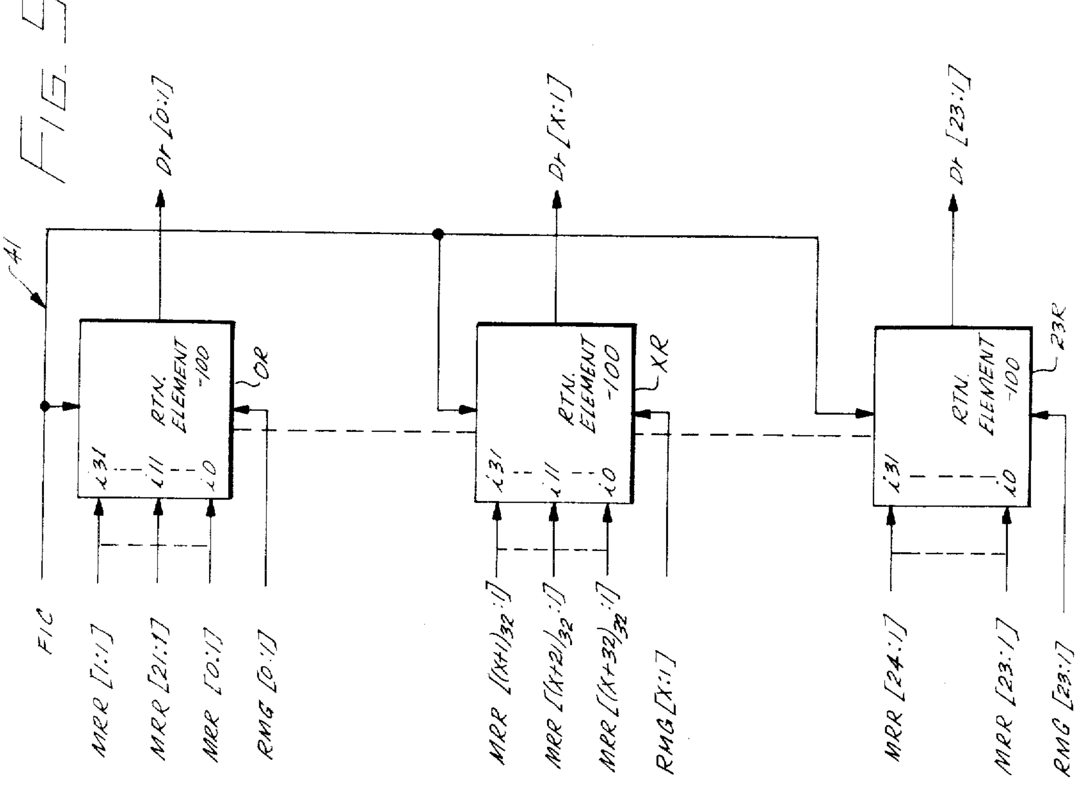
FIG. 5 is a block diagram of read rotator 41.

Consider now the construction of read rotator 41 which is shown in block diagram form in FIG. 5. Read rotator 41 comprises 24 rotation elements 100 which will be referred to as OR through 23R. The output of rotation element OR provides an input signal to Dr[0:1]; the output of rotation element 23R provides an input signal to Dr[23:1]; and the outputs of the rotation elements 1R through 22R (not shown) provide the input signals to Dr[1:1] through Dr[22:1] respectively.

The output of FIC50 provides rotation control signal to the 24 rotation elements of read rotation 41. In FIG. 5 a single line is shown to represent the lines from FIC50 for carrying the five rotation control signals. The output of read mask generator 45R provides enable input signals to read rotator 41 with RMG[0:1] through RMG[23:1] coupling to rotation elements OR through 23R respectively.

Rotation element *x*R illustrates the general rule governing the connections of the input and output lines. The output of rotation element *x*R provides the input signal to Dr[*x*:1] where *x* is any one of the digit places between 0 and 23. The enable input to rotation element xR is connected to receive the RMG[*x*:1] signal. The *i*0 input of rotation element *x*R is connected to receive MRR[$(x+32)_{32}$:1]. The terms $(x+32)_{32}$ represents the module 32 value of the sum of *x* and 32. As examples, for *x* equal to 0, $(x+32)_{32}$ equals 0; for *x* equal to 23, $(x+32)_{32}$ equals $(55)_{32}$ or 23. The *i*31 through *i*0 inputs of rotation element *x*R are connected to receive MRR[$(x+1)_{32}$:1] through MRR[ $(x+32)_{32}$:1] respectively. Thus, for *x* equal to 0 (i.e. rotation element OR), the *i*31 input receives MRR[1:1]; for *x* equal to 23 (i.e. rotation element 23R), the *i*31 input receives MRR[24:1].

In operation read rotator 41 transfers a selected field of data from MRR4OR and loads the selected field into data register 44, rotated to the left by a selected number of digit places.

Consider a specific example of operation wherein read rotator 41 transfers a four bit field of data from MRR[24:4] and loads that data field into Dr[3:4], thereby rotating decimal 11 digit places to the left. The FIC input in this example is 01011 (decimal 11) and the enable inputs receive 1 signals on RMG[3:4] and 0 signals on RMG[23:20]. The 0 signals on RMG[23:20] disable rotation elements 4R through 23R and thereby mask data transmission therethrough. The 1 signals on RMG[3:4] enable rotation elements OR through 3R and the FIC input causes each of these four rotation elements to gate its *i*11 input to its output. As shown in FIG. 5, the *i*11 input for the general case is MRR[$(x+21)_{32}$:1]. For *x* equal to 0 (i.e. rotation element OR), the *i*11 input is MRR[21:1]; for *x* equal to 1 (i.e. rotation element IR the i11 input is MRR[22:1]; for *x* equal to 2 (i.e. rotation element 2R), the i11 input is MRR[23:1]; and for *x* equal to 3 (i.e. rotation element 3R), the *i*11 input is MRR[24:1]. Thus in this example the MRR[24:4] field is rotated to the left by 11 digit places and loaded into Dr[3:4].

Figure 6:
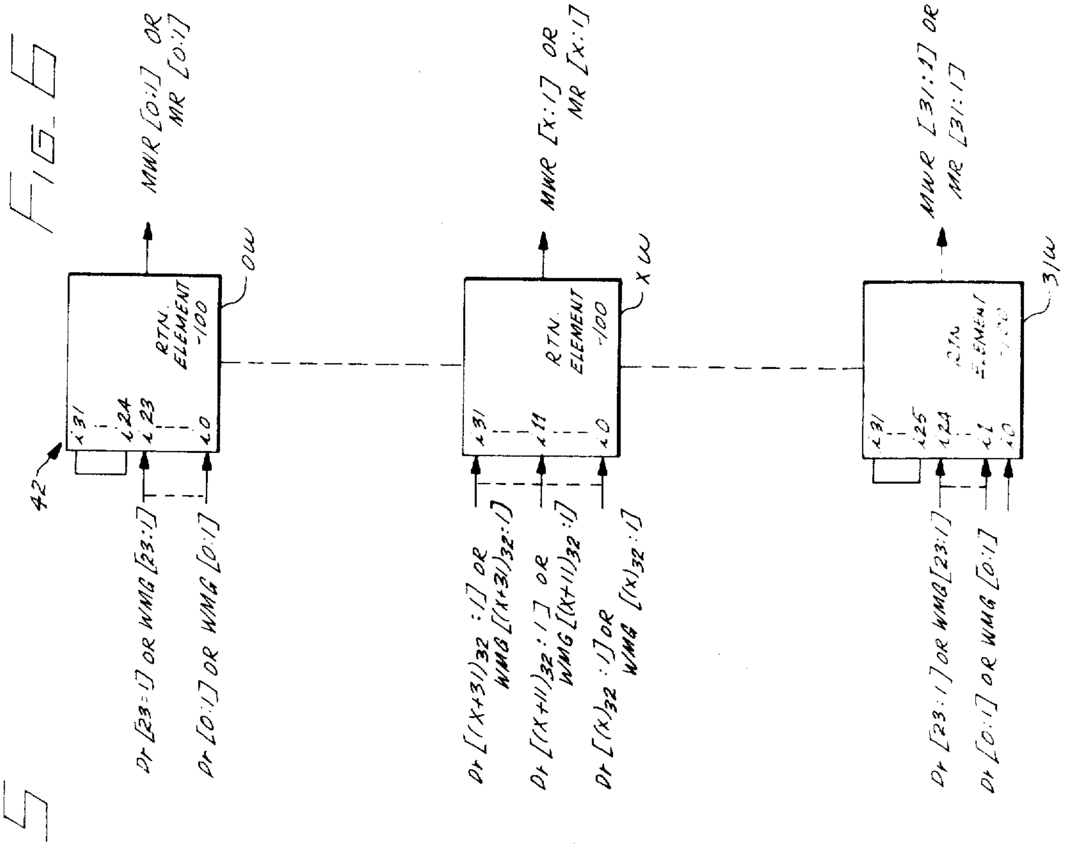
FIG. 6 is a block diagram of write rotator 42.

Consider now the construction and operation of write rotator 42 which is shown in block diagram form in FIG. 6. Write rotator 42 comprises 32 rotation elements OW through 31W. The output of write rotator 42 is coupled to MWR4OW through gate 49 and to WMR42 through gate 47. The output of rotation elements OW through 31W provide input signals to either MWR[0:1 ] or WMR[0:1] through MWR[31:1] or WMR[31:1] respectively. FIG. 6 shows rotation elements OW, 31W, and XW (illustrating the general case) and dashed lines suggest the existence of those not shown.

The output of FIC50 provides rotation control signals to the 32 rotation elements of write rotator 42. In FIG. 6 single line is shown to represent the lines for carrying the five rotation control signals. Although not shown in FIG. 6 the enable inputs to the 32 rotation elements Ow through 31W are all connected to receive a 1 signal.

The *i*0 through *i*23 inputs of rotation element 0W are connected to receive Dr[0:1] through Dr[23:1] respectively from gate 48 or to receive WMG[0:1] through WMG[23:1] respectively from gate 46. The *i*24 through *i*31 inputs of rotation element 0W are not used.

Rotation element *x*W illustrates the general rule governing the connections of the input lines. The output of rotation element *x*W provides the input to either MWR[*x*:1] or WMR*x*:1] where *x* is any one of the digit places between 0 and 31. The inputs to *i*0 through *i*31 are shown as Dr[$(x)_{32}$:1] or WMG[$(x)_{32}$:1] through Dr[$(x+31)_{32}$:1] or WMG[$(x+31)_{32}$:1] respectively. However only 24 of the 32 inputs of rotation element *x*W are actually used. For the terms where $(x+31)_{32}$ is greater than 23 the corresponding inputs to rotation element *x*W are not used.

Consider how the general rule applies to the specific case of rotation element 31W. In this case *x* equals 31. Since *x* is greater than 23 the *i*0 input of rotation element 31W is not used. Similarly $(x+25)_{32}$through $(x+31)_{32}$ are each greater than 23; therefore the *i*25 through *i*31 inputs are not used. For the *i*1 input $(x+1)_{32}$ equals $(31+1)_{32}$ or 0 and this input is connected to receive Dr[0:1] or WMG[0:1]. For the *i*24 input $(x+24)_{32}$ equals $(31+24)_{32}$ or 23 and this input is connected to receive Dr[23:1] or WMG[23:1].

In operation write rotator 42 transfers a 24 bit field of data derived from either data register 44 or write mask generator 45W and loads the 24 bit field into 24 of the 32 flip-flops of either MWR 40W or write mask register 43, rotated to the right by a selected number of digit places.

Consider a specific example of operation wherein write rotator transfers a field of data from Dr]23:23] and loads that data field into MWR[12:13] and MWR[31:11], thereby rotating decimal 11 digit places to the right. Note here that the 13 most significant bits of data register 44 (Dr[23:13]) are transferred to the right into MWR[12:13]; the 11 least significant bits of data register 44 (Dr[10:11]) are rotated out of the right end and are transferred into MWR[31:11]; and that 0 signals are transferred into MWR[20:8]. The FIC input in this example is 01011 (decimal 11) and this FIC input causes each of the 32 rotation elements 0W through 31W to gate its *i*11 input to its output. As shown in FIG. 6, the i11 input for the general case is Dr[$(x+11)_{32}$:1]. For $x$ equal to 0 through 12 (i.e. rotation elements 0W through 12W) the *i*11 inputs are Dr[11:1] 23:1] respectively. Thus Dr[23:13] is transferred into MWR[12:13]. For $x$ equal to 13 through 20 (i.e. rotation elements 13W through 20W), the *i*11 inputs $(x+11)_{32}$ are $(13+11)_{32}$ or 24 through $(20+11)_{32}$ or 31, all of which are greater than 23, and therefore these inputs are not used. Since their i11 inputs are not used, the rotation elements 13W through 20W cause 0 signals to be transferred into MWR[20:8]. For $x$ equal to 21 through 31 (i.e. rotation elements 21W through 31W) the *i*11 inputs $(x+11)_{32}$ are $(21+11)_{32}$ or 0 through $(31+11)_{32}$ or 10. Thus Dr[0:1] through Dr[10:1] are connected to the i11 inuts of rotation elements 21W through 31W respectively, and Dr[10:11] is transferred thereby into MWR[31:11].

Figure 7:
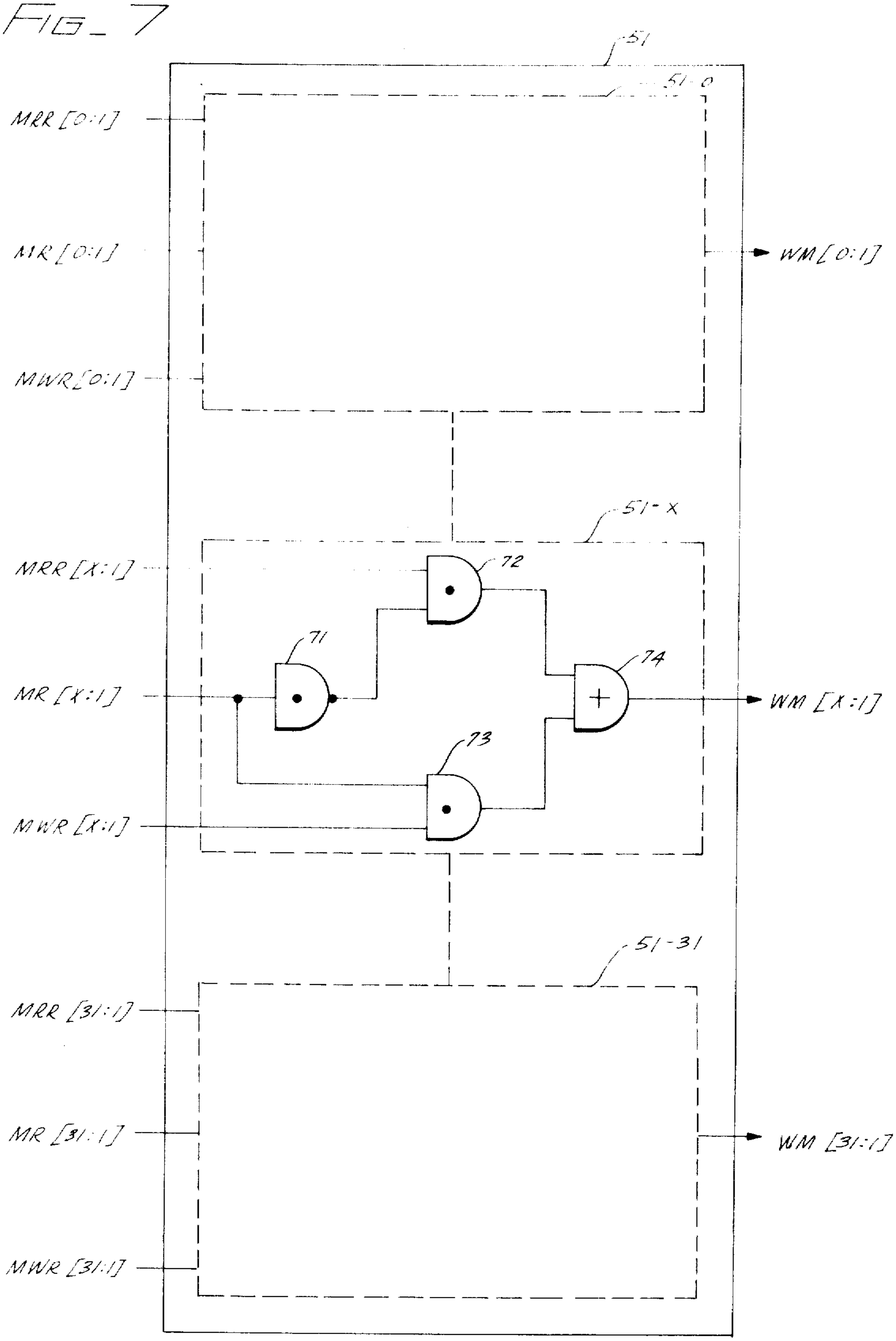
FIG. 7 is a block diagram of write merger 51.

Consider now the construction of write merger 51 which is shown in block diagram form in FIG. 7. Write merger 51 comprises 32 identical merger elements 51-0 through 51-31. In FIG. 7, only three of the merger elements are shown by way of example.

Each merger element 51 is operable to gate to its output line either a data bit derived from MRR4OR or a data bit derived from MWR4OW in accordance with a mask signal derived from mask register 43.

Within merger element 51–$x$, which illustrates the general case, there is shown an inverter 71, AND gates 72 and 73, and OR gate 74. The output of MR[$x$:1] is applied to the input of inverter 71 and to one of two inputs of AND gate 73. The other input of AND gate 73 receives the output of MWR[$x$:1]. AND gate 72 has two inputs which receive the output of inverter 71 and the output of MRR[$x$:1]. The outputs of AND gates 72 and 73 are applied to OR gate 74. The output of OR gate 74 is referred to as WM[$x$:1].

The WM[$x$:1] output will be the same as the MRR[$x$:1] input when MR[$x$:1] is a 0. This is bcause inverter 71 responds to its 0 input signal to apply a 1 signal to AND gate 72 and thereby enables transmission of the signal from MRR[$x$:1] through AND gate 72 and OR gate 74 to the WM[$x$:1] output. Furthermore, the 0 signal on MR[$x$:1] disables gate 73 and prevents the MWR[0:1] signal from affecting the output WM[$x$:1].

The WM[$x$:2] output will be the same as the MWR[$x$:1] input when MR[$x$:1] is a 1. This is because AND gate 73 responds to its 1 signal input to gate the MWR[$x$:1] signal through OR gate 74 to the output WM[$x$:1]. Furthermore, the 1 signal on MR[$x$:1] causes inverter 71 to disable AND gate 72 and prevents the MRR[$x$:1] signal from affecting the output WM[$x$:1].

Figure 8:
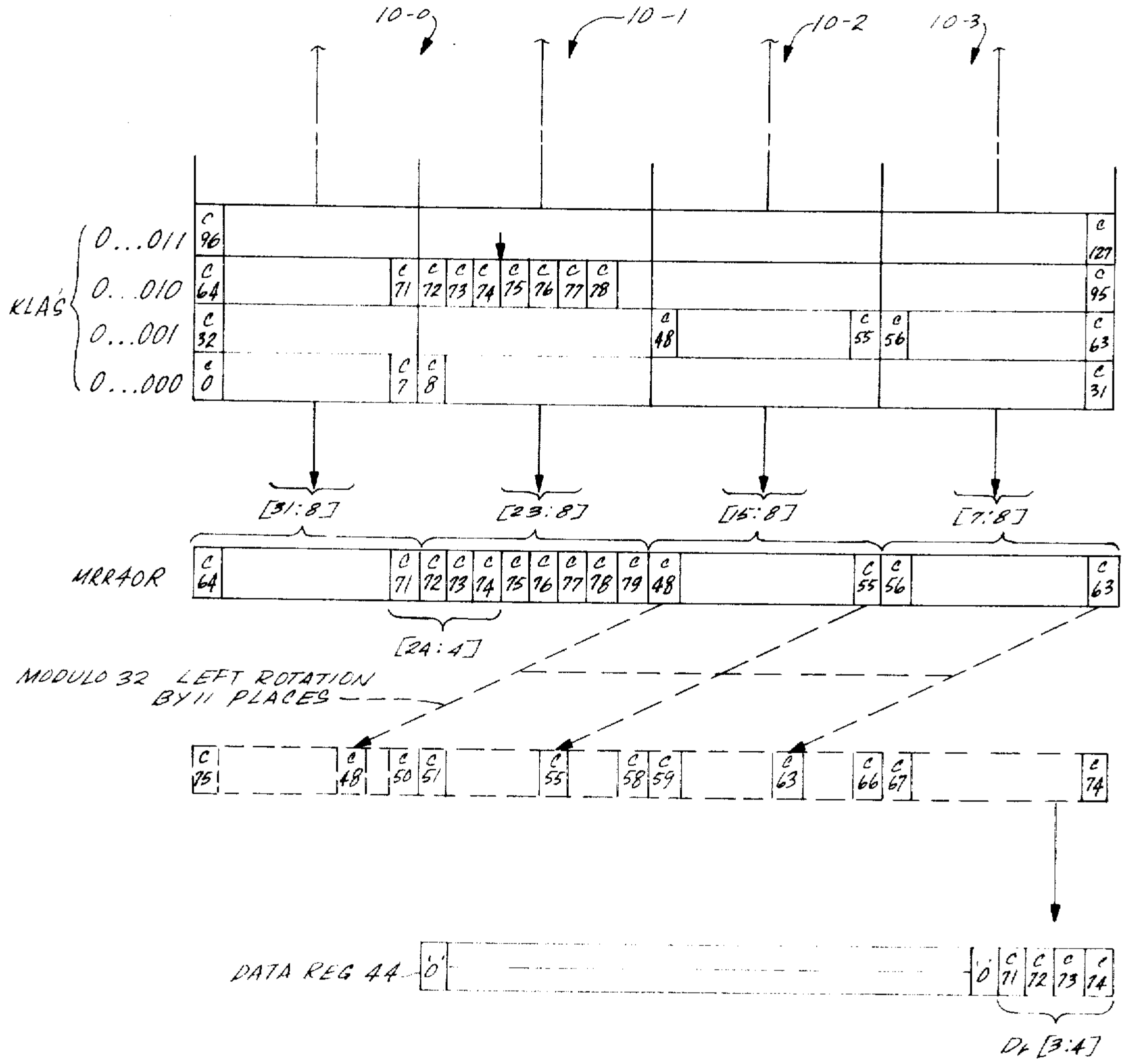
FIg. 8 is a sketch showing the manner in which a data field is read from the memory and transferred to a data register.

FIg. 8 is a diagrammatic representation of the manner in which a desired field of data is read from memory 10. At the top of FIG. 8 there is shown a matrix representing memory 10. The rows of the matrix represent the locations of the modules of memory 10. The locations are assigned sequential binary absolute addresses proceeding upwardly from the bottom of the matrix. The matrix has four major columns which represent the four modules 10–0 through 10–3. Each location has eight containers for storing what is called a byte of information. The containers have been assigned sequential numbers from C0 through C127. The dashed lines drawn in and above the matrix indicate that there are many more containers which have not been shown.

Assume as a specific example of operation that a BBA equal to decimal 75 or binary 0 . . . 01001011 has been stored in binary form in address register 30. Thus Ar[23:17] stores all 0's and Ar[6:7] stores the binary field 1001011. The following subfields of the BBA should also be noted: Ar[23:19] which defines the KLA will store the binary equivalent of decimal 2; and Ar[4:2] stores the binary field 01.

Assume also for this example that B register 35 stores a transfer vector having a transfer sign indicating an addressing direction toward lower numbered containers (containing bits of higher order significance) and having a transfer width indicating that data should be transferred from four containers. Thus Br[5:5] stores the binary field 00100 and Br[0:1] stores a binary 1'. The BBA and the transfer vector in combination define a bounded set of containers in memory 10 from which a field of data is to be read. In this example, those containers are C71, C72, C73, and C74. Recall that according to a convention adopted for the preferred embodiment the least significant bit of a data field is stored in the highest numbered container of the containers storing the field.

Referring again to the table of Table II it can be seen that when TS is a 1, MSM is a 0 and MSL is a 1 as they are in this example, network 15 distributes absolute addresses as follows: MAC11 -0 and MAC11-1 receive the unmodified KLA field and MAC11-2 and MAC1-1-3 receive the modified KLA field KLA-1. Thus MAC11-0 and MAC11-1 will respond to access the location 0 . . . 010 in modules 10–0 and 10–1 respectively and MAC11-2 and MAC11-3 will respond to access location 0 . . . 001 in modules 10–2 and 10–3 respectively.

FIG. 8 shows that the contents of the accessed locations are transferred to MRR40R. MRR[31:8] receives the contents of containers C64 through C71 from module 10–0; MRR[23:8] receives the contents of containers C72 through C79 from module 10–1. MRR[15:8] receives the contents of containers C48 through C55 from module 10–2; and MRR[7:8] receives the contents of containers C56 through C63 from module 10–3. It should be noted that the desired field of data occupies MRR[24:4] with the least significant bit occupying MRR[21:1]

Consider now the operation of FIC50 in connection with this example of operation. Since the specified BBA is decimal 75, the MBS subfield is 01011 which is the binary equivalent of decimal 11. Since TS is a 1 inverter 50–1 within FIC50 responds to TS to disable gate 50–2 and therefore the output of adder 50–3 is the same as the MBS field or 01011. Thus read rotator 41 responds to rotate the data field by decimal 11 digit places. It should be noted that this rotation causes the least significant bit of the data field to be rotated from its position in MRR[21:1] so that it can be applied to the least significant digit place (i.e., Dr[0:1]) of data register 44.

FIG. 8 also shows that read rotator 41 transferred only the four desired bits of data into data register 44. This transfer is accomplished in this manner because read mask generator 45R responds to the TW indication of decimal 4 to produce an output consisting of 20 leading 0's and four trailing 1's. This output is applied to the 24 enable inputs of read rotator 41 and thereby enables four corresponding rotation elements therein and disables (i.e., masks) all remaining corresponding rotation elements. Therefore there is no transmission of data bits into the first 20 flip-flops of data register 44 (i.e., Dr[23:20]) and each of these flip-flops store 0's. However there is a transmission of data bits into the last four flip-flops of data register 44 (i.e., Dr[3:4]) and these flip-flops store the contents read out from containers C71, C72, C73, and C74.

Consider now a second example wherein BBA is again decimal 75 and TW is again 00100 but wherein TS is a 0 instead of a 1. Thus the specified BBA indicates the lower boundary of the most significant bit of the desired field which in this example occupies containers C75, C76, C77, and C78. The contents of containers C96–C103, C72–C79, C80–87, and C88–C95 are transferred into MRR[31:8], MRR[23:8], MRR]15:8], and MRR[7:8] respectively. The desired field occupies MRR[20:4] with the least significant bit occupying MRR[17:1]. Thus the least significant bit in this example is four digit places to the right of the digit place (MRR[21:1]) which stored the least significant bit in the first example. Thus the desired field is rotated by 11 plus 4 or 15 digit places to the left so that the least significant bit can be applied to Dr[0:1].

To that end inverter 50–1 within FIC50 responds to TS to enable gate 50–2 to apply the TW field of 00100 to adder 50–3. Therefore the output of adder 50–3 is the modulo 32 sum of the MBS field and the TW field. This sum is 01111 or decimal 15. Therefore read rotator 41 rotates the data field by 15 digit places. As in the first example, read rotator 41 operates to mask out the transfer of the 20 leading bits and enable the transfer of the four trailing bits into data register 44. Therefore in this example Dr[23:20] stores 0's and Dr[3:4] stores the contents of containers C75, C76, C77, and C78.

Consider briefly the read/modify/restore phases of a write operation. Assume again that a BBA of 75 is stored in A register 30 and a transfer vector with a TS equal to 1 and a TW equal to decimal 4 is stored in B register 35. Thus the BBA and the transfer vector define the same set of containers (C71, C72, C73, and C74) as were defined in the first example of operation described above. FIC50 again produces on its output an indication that a rotation of 11 digit places is required. However since a write operation is to be performed the direction of rotation is to the right instead of to the left as in the read operation.

Preparatory to the write operation a new field of data is stored in data register 44 by any means well known in the computer art. Under the above-described conditions the new data is a four bit field of data. During the read phase the MACs cause the old data stored in containers C48 through C79 to be read out in the same way in which they were read out in the above-described first example of operation. Thus MRR[24:4] stores the contents of containers C71, C72, C73, and C74.

During the modify phase source 80 produces signal T1 which is applied to gates 46 and 47 thereby gating the output of write mask generator 45 to the input of write rotator 42 and the output of write rotator 42 to the input of write mask register 43. Write rotator responds to the output of FIC50 to cause the ouptut of write mask generator 45W to be rotated to the right by 11 digit places for storage within masking register 43. Thus the four trailing 1's of the output of write mask generator 45W are rotated to the right by 11 digit places and now occupy MR[24:4]. Later during the modify phase source 80 produces signal T2 which is applied to gates 48 and 49. During T2 write rotator 42 responds to the same output of FIC50 to cause the contents of data register 44 to be rotated to the right by 11 digit places for application to MWR40W. Write merger 51 responds to the outputs of MRR40R, MWR40W, and mask register 43 by transferring 28 old data bits and four new data bits to memory 10. During the restore phase the contents of containers C71, C72, C73, and C74 will be changed to reflect the new data field whereas the contents of the other containers in memory 10 will be unaffected by the memory access.

TABLE I

ADDRESS FIELD DESIGNATIONS

| | |
|---|---|
| Ar[23:24] | Bit Boundary Address (BBA) |
| Ar[23:19] | Key Location Address (KLA) |
| Ar[4:2] | Module Select (MS) |
| Ar[4:5] | Module Boundary Select (MBS) |
| Ar[4:1] | Most Significant bit of M.S. (MSM) |
| Ar[3:1] | Least Significant bit of M.S. (MSL) |
| Br[5:6] | Transfer Vector (TV) |
| Br[5:5] | Transfer Width (TW) |
| Br[0:1] | Transfer Sign (TS) |

TABLE II

ADDRESS DISTRIBUTION TRUTH TABLE

| TS | MSM | MSL | MAC-0 | MAC-1 | MAC-2 | MAC-3 |
|---|---|---|---|---|---|---|
| 0 | 0 | 0 | KLA | KLA | KLA | KLA |
| 1 | 0 | 0 | KLA | KLA−1 | KLA−1 | KLA−1 |
| 0 | 0 | 1 | KLA+1 | KLA | KLA | KLA |
| 1 | 0 | 1 | KLA | KLA | KLA−1 | KLA−1 |
| 0 | 1 | 0 | KLA+1 | KLA+1 | KLA | KLA |
| 1 | 1 | 0 | KLA | KLA | KLA | KLA−1 |
| 0 | 1 | 1 | KLA+1 | KLA+1 | KLA+1 | KLA |
| 1 | 1 | 1 | KLA | KLA | KLA | KLA |

We claim:

1. A memory and addressing system therefor comprising:

an input-output circuit;

a memory comprising a sequence of addressable memory locations, a separate one of a sequence of memory location addresses being assigned to each of said memory locations, each location including a plurality of bit storing containers, the containers being assigned a predetermined sequential order within memory locations and from one memory location to the next in the sequence of memory locations, thereby forming a corresponding sequence of imaginary boundaries located between adjacent containers in the sequential order, a sequence of boundary addresses assigned, one to each of, said imaginary boundaries,;

means for receiving address codes identifying a desired continuous sequence of containers, each address code comprising a first field for specifying as the beginning of the desired continuous sequence any one of the boundary addresses and a second field for specifying the desired continuous sequence of containers as being on one of either side of the specified boundary address, predetermined ones of said address codes identifying a desired continuous sequence of containers in a plurality of different memory locations and having a first field specifying a boundary address between any two adjacent containers included within a single memory location;

circuit means responsive to said received addresses for producing memory location addresses and comprising means responsive to said predetermined address code for producing a plurality of memory location addresses comprising the address of each of said plurality of different memory locations including the address of said single memory location;

the memory further including memory accessing means for accessing each of the memory locations corresponding to the plurality of produced memory location addresses; and circuit means coupled between the input-output circuit and the memory for selectively transferring bits therebetween and comprising selection means responsive to the same predetermined address code used for accessing for selecting bits for transfer between only the identified desired continuous sequence of containers and the input-output circuit.

2. A system according to claim 1 wherein the receiving means includes means for receiving a third field as a part of each address code, the third field for specifying one of a variable number of containers and wherein the circuit means for selectively transferring bits includes means responsive to each received third field for transferring only the number of bits specified by the third field.

3. A system according to claim 1 wherein the memory comprises a plurality of independently addressable memory modules having corresponding pluralities of said locations; the memory accessing means includes a different module access control circuit coupled to each memory module, each module access control circuit being responsive to an absolute address to access in parallel all containers in the corresponding location in the memory location to which it is coupled; and wherein the circuit means for producing memory location addresses provides substantially simultaneously a memory location address to each module access control circuit.

4. A memory and addressing system therefor comprising:

register means;

a memory including a sequence of addressable memory locations, the memory locations having respectively assigned to them a separate one of a sequence of memory location addresses, each location including a plurality of bit storing containers, the containers being assigned a predetermined sequential order within memory locations and from one memory location to the next in the sequence of memory locations, thereby defining a corresponding sequence of imaginary boundaries each shared with adjacent containers on opposite sides, a first one of the locations having stored in some of its containers one part of a field of information and a second one of the locations having stored in some of its containers another part of the field of information such that the field of information is stored in a continuous sequence of containers;

a source of address codes, each address code for identifying a continuous sequence of containers and comprising first and second fields, the first field for specifying as the beginning of the identified continuous sequence an arbitrary boundary address, the second field for indicating the direction in which the identified sequence of containers extends from the specified boundary address, the address codes including first and second address codes that each identify the same containers that are in the first and second location and that store the field of information;

circuit means for producing memory location addresses, the circuit means being coupled to the address code source, and responding to either the first or second address codes to produce the memory location addresses for the first and second locations;

memory access means including means responsive to the produced memory location addresses to read out all of the bits stored in the first and second locations; and circuit means coupled between the register means and the memory for selectively transferring bits and including selective transfer means responsive to either the first or second address code for transferring to the register means out of all the bits read out of the first and second locations only those bits forming said field of information.

5. Apparatus according to claim 4 wherein the means producing the memory location addresses includes address modification means modifying the first field to produce a first modified address in response to the first address code and to produce a second, different modified address in response to the second address code, the first modified address being the address of the first location and the second modified address being the address of the second location.

6. Apparatus according to claim 5 wherein the address code source further comprises means providing a third field for indicating the number of bits in a field of information; and wherein the selective transfer means includes isolating means responsive to the third field for transferring to the register means the number of bits of information indicated by the third field and read out from the memory by the memory access means.

7. Apparatus according to claim 4 wherein the memory comprises a plurality of independently addressable memory modules having corresponding pluralities of said locations, and the memory access means include a different module access control circuit coupled to each memory module, each access control circuit being responsive to an memory location address to read out in parallel all containers in a selected location in the memory module to which it is coupled; and wherein the address producing means provides substantially simultaneously a memory location address to each module access control circuit so that the first and second locations can be read out at substantially the same time.

8. Apparatus according to claim 7 wherein the address code source further comprises means providing a third field for indicating the number of bits in a field of information; and wherein the selective transfer means includes isolating means responsive to the third field for transferring to the register means the number of bits indicated by the third field and read out substantially simultaneously from the memory modules by the module access control circuits.

9. Apparatus according to claim 7 wherein the source of address codes includes means for providing as a part of the first field a subfield that is the memory location address of the location in one of the memory modules and which location includes a container sharing the specified boundary address; and wherein the means producing the memory location addresses includes means for modifying the first field to produce a modified address, means to provide the subfield as an absolute address to one of the module access control circuits and, means to provide the modified address as a memory location address to at least one other module access control circuit.

10. Apparatus according to claim 7 wherein the register means is a multi-stage register for storing multi-bit fields in a predetermined order of significance; and further comprising a memory read register; each module access control circuit loading a different portion of the memory read register with data bits read out of the selected location in the module to which it is coupled; and wherein the selective transfer means includes rotation circuit means coupled between the memory read register and the multi-stage register for transferring a field of information therebetween such that the multi-stage register receives multi-bit fields of information in the predetermined order of significance.

11. A memory system comprising an addressable memory having a plurality of sequentially adjacent containers including a top container, a bottom container, and a plurality of intermediate containers, each container for storing a bit of a field of information, and each container having an upper and a lower boundary address with the upper and lower boundary addresses of each intermediate container being shared with adjacent containers on opposite sides; first means for simultaneously identifying any arbitrary contiguous group of adjacent containers, each such group having a lower boundary address, an upper boundary address, and a variable number of containers therebetween, the variable number being between one and a prefixed number greater than one, the first means including means for storing a three address field, the first address field for specifying an arbitrary boundary address between adjacent containers storing data bits of two different fields of information, the second address field for indicating whether the first field specifies the upper or lower boundary address of the contiguous group, and the third field indicating the variable number; and second means responsive to the first means for transferring only the data bits stored in the identified contiguous group to a circuit in the system.

* * * * *

PO-1050
(5/69)

UNITED STATES PATENT OFFICE
CERTIFICATE OF CORRECTION

Patent No. 3,781,812 Dated December 25, 1973

Inventor(s) Charles E. Wymore; Clayton P. Dahlberg

It is certified that error appears in the above-identified patent and that said Letters Patent are hereby corrected as shown below:

Col. 2, line 5, After "MIR" there should be an arrow --←--
Col. 2, line 15, After "MIR" there should be an arrow --←--
Col. 2, line 45, After "MSB" there should be an arrow --←--
Col. 2, line 59, "cating" should be --cated--
Col. 3, line 8, "thee" should be --the--
Col. 3, line 26, "is" should be --it--
Col. 4, line 37, "10-10" should be --10-0--
Col. 5, line 39, "MWR400R" should be --MWR40R--
Col. 6, line 48, "Table Ii" should be --Table II--
Col. 7, line 21, Before "BBA" the symbol should be -- ≡--
Col. 7, line 28, "MSM" (third occurrence) should be --$\overline{MSM}$--
Col. 7, line 30, "MSL" should be --$\overline{MSL}$--
Col. 7, line 43, "Ts" should be --TS-- (first occurrence) and "Ts" should be --$\overline{TS}$-- (second occurrence)
Col. 7, line 45, "TS" should be --$\overline{TS}$--
"BR[0:1]" should be --Br[0:1]--
Col. 7, line 46, "TS" (second occurrence) should be --$\overline{TS}$--
Col. 8, line 61, "TS" (second occurrence) should be --$\overline{TS}$--
Col. 8, line 66, "TS" should be --$\overline{TS}$--
Col. 9, line 26, "stores" should be --stored--
Col.10, line 2, "TS" "MSM" and "MSL" should be --$\overline{TS}$--, --$\overline{MSM}$-- and --$\overline{MSL}$--
Col.10, line 18, "TS" and "MSM" should be --$\overline{TS}$-- and --$\overline{MSM}$--

PO-1050
(5/69)

UNITED STATES PATENT OFFICE
CERTIFICATE OF CORRECTION

Patent No. 3,781,812 Dated December 25, 1973

Inventor(s) Charles E. Wymore; Clayton P. Dahlberg Page - 2

It is certified that error appears in the above-identified patent and that said Letters Patent are hereby corrected as shown below:

Col.10, line 20, "TS" and "MSL" should be --$\overline{TS}$-- and --$\overline{MSL}$--
Col.10, line 22. "TS" should be --$\overline{TS}$--
Col.10, line 54, "rorates" should be --rotates--
Col.12, line 38, "thorugh" should be --through--
Col.13, line 39, "signal" should be --signals--
Col.14, line 28, "WMR42" should be --WMR43--
Col.14, line 39, "Ow" should be --OW--
Col.14, line 50, "WMRx:1]" should be --WMR[x:1]--
Col.15, line 8, "Dr]23:23]" should be --Dr[23:24]--
Col.15, line 23, After "Dr[11:1]" insert --through Dr[--
Col.15, line 34, Change "inuts" to --inputs--
Col.15, line 57, "bcause" should be --because--
Col.15, line 65, "WM[x:2]" should be --WM[x:1]--
Col.16, line 34, " 1' " should be -- '1' --
Col.16, line 58, After "10-1" there should be a semi-colon Col.17, line 35, "MRR]15:8]" should be --MRR[15:8]--
Col.20, line 63, Delete "an" insert --a--.

Signed and sealed this 25th day of June 1974.

(SEAL)
Attest:

EDWARD M. FLETCHER, JR.
Attesting Officer

C. MARSHALL DANN
Commissioner of Patents